United States Patent [19]

Ghufran et al.

[11] Patent Number: 5,745,490
[45] Date of Patent: Apr. 28, 1998

[54] VARIABLE BIT RATE SCHEDULER

[75] Inventors: Salman Ghufran, Burnaby; David Wong, Vancouver, both of Canada

[73] Assignee: PMC-Sierra, Inc., Burnaby, Canada

[21] Appl. No.: 666,087

[22] Filed: Jun. 19, 1996

[51] Int. Cl.$^6$ ................................. H04L 12/28
[52] U.S. Cl. ........................... 370/397; 370/412
[58] Field of Search ........................... 370/232, 375, 370/378, 389, 392, 396, 397, 412

[56] References Cited

U.S. PATENT DOCUMENTS

| | | | |
|---|---|---|---|
| 5,497,375 | 3/1996 | Hluchyj et al. | 370/232 |
| 5,515,363 | 5/1996 | Ben-Nun et al. | 370/232 |
| 5,533,020 | 7/1996 | Byrn et al. | 370/412 |
| 5,579,302 | 11/1996 | Banks | 370/397 |

*Primary Examiner*—Wellington Chin
*Assistant Examiner*—Soon-Dong Hyun
*Attorney, Agent, or Firm*—Myers, Liniak & Berenato

[57] ABSTRACT

A variable bit rate scheduler for ATM traffic shaping which includes a service rate queue (SRQ) counter for generating a base traffic profile for the control of data transmission on a virtual channel, a virtual channel peak cell rate determinator coupled to said SRQ counter and operative to determine a virtual channel peak cell sub-rate, VC_PCR, a leaky bucket having an input for receiving sub-tokens and an output for discharging tokens and means for adding sub-tokens at the virtual channel peak cell rate to the leaky bucket and, when a cell is to be transmitted, removing a number of tokens from the bucket equal to the ratio of a virtual channel sustainable cell rate. The virtual channel sustainable cell rate is a fraction of or equal to the virtual channel peak cell rate.

13 Claims, 3 Drawing Sheets

VARIABLE BIT RATE SCHEDULER

FIELD

The present invention relates to a variable bit rate scheduler which shapes data before admitting it into an ATM network.

BACKGROUND

Variable bit rate traffic, such as data from computers, is bursty by nature and requires "shaping" before being admitted into an ATM network. Without the proper "shaping" of the data, the design and management of the network and its components would be very complicated. One method employed to "shape" traffic in ATM networks is to control the rate of the data transmitted on a virtual channel. Virtual paths and virtual channels are mechanisms used to provide for a sequential unidirectional transport of ATM cells. Each ATM cell has a virtual channel indicator field, VCI field, and a virtual path indicator field, VPI field. An ATM cell is assigned virtual channel and virtual path indicator values which together define a virtual channel connection at one end of the connection. Those VCI and VPI values are translated or removed at the destination end of the connection. The cell is not removed or modified until it is removed or translated at the end point of the virtual channel connection. For example, between an ATM switch and physical layer device there may be 10 virtual paths with each virtual path having 128 virtual channels for each the receive and transmit directions. Physically, the coupling could be two light fibres.

In order to control the rate of data transmission on a virtual channel, a method is required which can determine when data should be transmitted on such a channel.

SUMMARY OF THE INVENTION

According to the invention there is provided a variable bit rate scheduler for ATM traffic shaping which includes a service rate queue (SRQ) counter for generating a base traffic profile for the control of data transmission on a virtual channel, a virtual channel peak cell rate determinator coupled to said SRQ counter and operative to determine a virtual channel peak cell sub-rate, VC_PCR, a leaky bucket having an input for receiving sub-tokens and an output for discharging tokens and means for adding sub-tokens at the virtual channel peak cell rate to the leaky bucket and, when a cell is to be transmitted, removing a number of tokens from the bucket equal to the ratio of a virtual channel sustainable cell rate VC_SCR. The virtual channel sustainable cell rate is a fraction of or equal to the virtual channel peak cell rate.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

The concept of virtual channels and virtual paths are used to create non-physical links between a transmitter and receiver over an intermediate medium such as a pair of optical fibres linking an ATM switch and a Physical Layer Device. In this case the fibre can be considered as being divided up into a number of paths or bands called virtual path connections (VPC) with each virtual path connection further divided up into a number of virtual channel connections. Cells transmitted over such medium are assigned virtual path and virtual channel index numbers which define the destination of the cell. The virtual path designator is used as an area designator with the virtual channel designating a specific location in that area.

Due to the limitation on the rate of transmission permitted for each channel and the bursty nature of the cell transmission it is necessary to control the rate of transmission on a virtual channel. One can establish the following "traffic shaping" rules to obtain rate control over data transmitted on a virtual channel. First one may require the average transmission rate of a virtual channel over time to be $T_{scr}$ and define the sustainable cell rate of a virtual channel as VC_SCR. Second, one may require that no two cells may be transmitted within a time interval $T_{pcr}$ of each other. The time interval $T_{pcr}$ corresponds to a Peak Cell Rate of VC_PCR. Third, one may require that no virtual channel may burst more than its allowable maximum burst size, VC_MBS, at its peak cell rate of VC_PCR. Using these rules and referring to FIG. 1 which displays a leaky bucket algorithm one can readily establish the relationship between VC_SCR, VC_PCR and VC_MBS and how these values are applied to traffic shaping rules.

Figure 1:
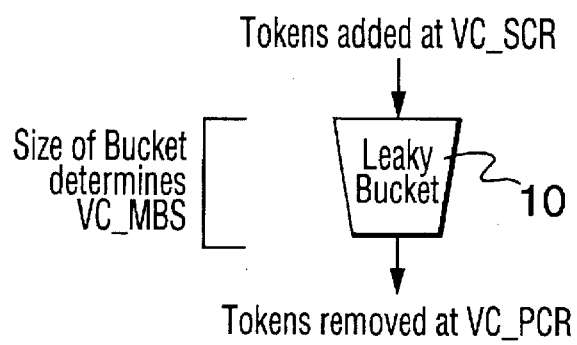
FIG. 1 is a schematic diagram of a leaky bucket algorithm used in the present invention.

It is clear from FIG. 1 that data can only be transmitted when there is a token present in the leaky bucket 10. If the bucket 10 is empty, tokens can only be removed at the rate of addition, which is VC_SCR, the virtual channel sustained or average cell rate. If no data has been transmitted for a while, the bucket 10 fills up to its maximum size. Now tokens can be removed at the rate of VC_PCR but only until the bucket empties. This defines the maximum burst size for the virtual channel. After the burst is completed transmission continues at the rate of VC_SCR.

Figure 2:
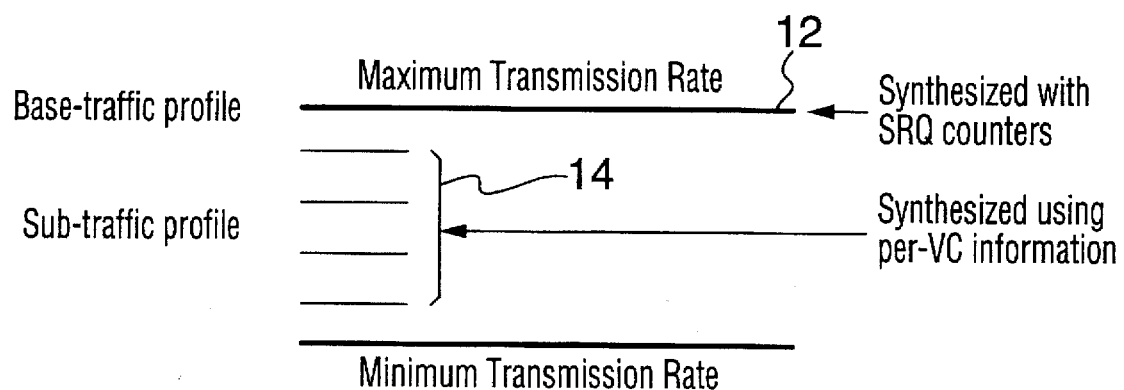
FIG. 2 is a diagram showing the relationship between traffic profiles and the sub-blocks used in the VBR scheduler to implement the traffic profiles.

A variable bit rate scheduler (VBR) must rely upon a number of base traffic profiles wherein each traffic profile represents a particular rate at which data for a given virtual channel can be transmitted. In addition to base traffic profiles, sub-profiles can be established from traffic information corresponding to each virtual channel as shown in FIG. 2. Service Rate Queue (SRQ) counters (see FIG. 3) are used to generate a base-traffic profile 12. The number of sub-profiles 14 required depends upon the requirements of the variable bit rate scheduler.

Figure 3:
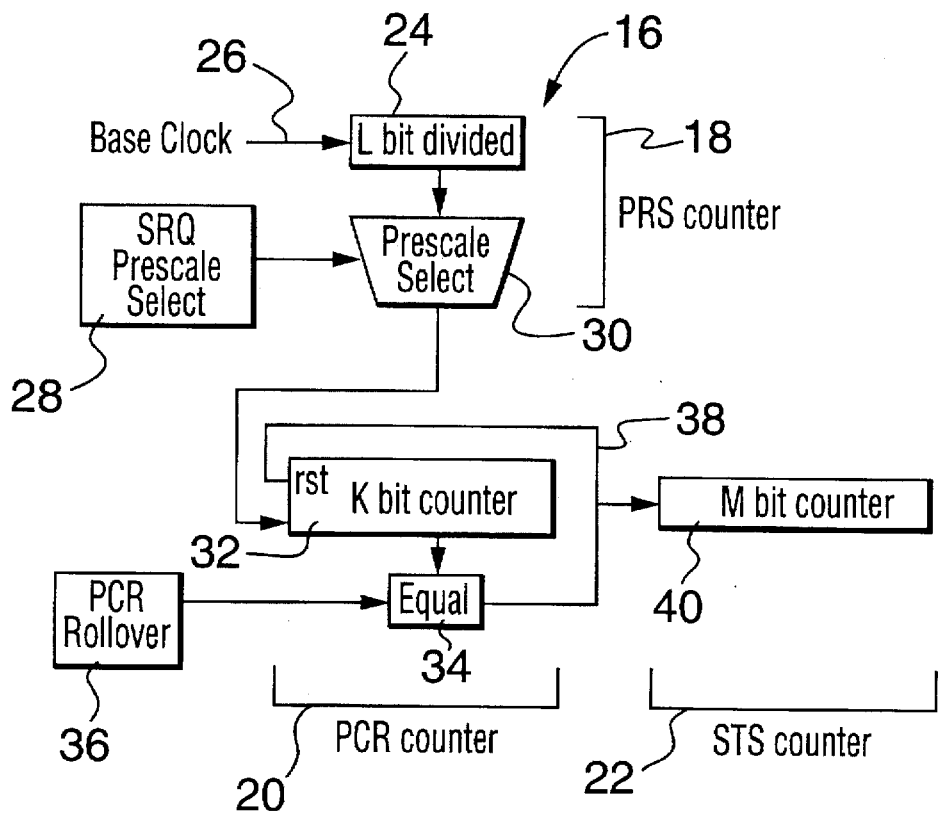
FIG. 3 is a schematic diagram showing the counter system.

Referring to FIG. 3, each SRQ counter 16 is comprised of three counters, namely, a Prescale (PRS) Counter 18, a Peak Cell Rate (PCR) counter 20 and a Saturating Timestamp Counter (STS) counter 22. The PRS counter 18 consists of a L bit divider circuit 24 into which is fed a base clock on line 26. The output of circuit 24 is directed into a Prescale Select register 30 which has a prescale value set by the SRQ Prescale Select circuit 28. The prescale value is used to scale down the output of the circuit 24. Scaled counts from the Prescale Select circuit 30 are counted in a K bit counter 32. The count in K bit counter 32 is fed to a comparator 34. Another input to comparator 34 is from a PCR Rollover Counter 36. When the K bit counter 32 reaches a value equal to the PCR Rollover value on PCR Counter 34 a reset pulse is issued on line 38 by the comparator 34 which resets K bit counter 32 and sends a signal to M bit counter 40 which comprises a Saturating Timestamp (STS) Counter 22 used for token generation and indicating when transmission opportunities occur.

If the virtual channel peak cell rate VC_PCR is equal to the SRQ_PCR then there is a one-to-one correspondence between the roll over of the PCR Counter 20 and the peak cell rate of the SRQ counter 16. The virtual channel in this case is the same as the base traffic profile 12 as shown in FIG. 2. If, however, VC_PCR is ½ or ¼ of the SRQ_PCR, every two or four rollovers of the PCR counter 20 would, respectively, correspond to the VC_PCR. The virtual channels in this case correspond to sub-traffic profiles of ½ and ¼, respectively, of the base-traffic profile.

Each time the STS counter 22 is accessed to indicate a transmission opportunity or to produce a token, the information required to generate the lower VC_PCR is lost. It has been determined that the minimum information required to be saved in order to generate the lower VC_PCR is the N least significant bits of the STS Counter 22 where the factor $\frac{1}{2}^N$ when multiplying the SRQ_PCR value produces the lowest VC_PCR. A table giving the number of STS counter bits and a corresponding parameter SUB_SRQ_RATE for sub-traffic profiles 14 is shown in the following table.

| SUB_SRQ_RATE | NO. OF STSC BITS |
|---|---|
| 1 | 0 |
| 1/2 | 1 |
| 1/4 | 2 |
| 1/8 | 3 |
| 1/2**N | N |

If, for example, N is 3 so that the virtual channel SUB_SRQ_RATE is ⅛th of the base profile rate, then if at the time the M bit counter 40 is serviced there is only 1 bit in the counter, then that bit, which is the residue, is saved. The next time the M counter 40 is accessed there would be 2 bits in the M Counter 40.

Figure 4:
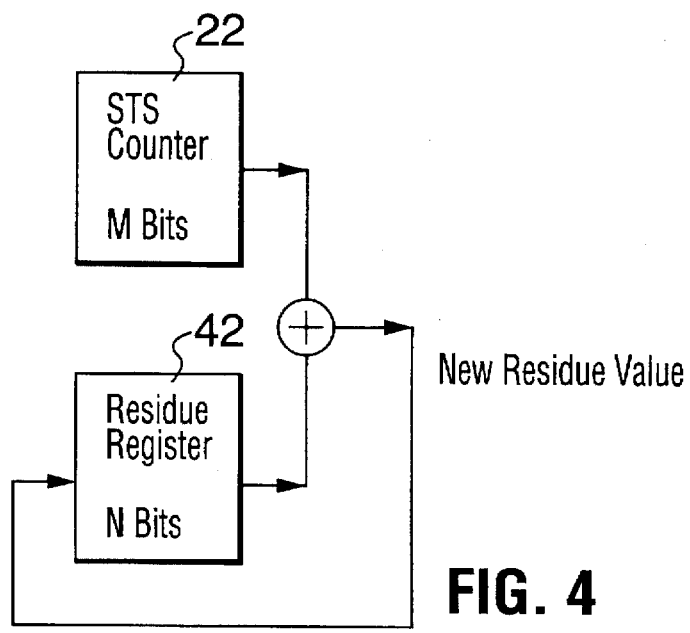
FIG. 4 is a schematic diagram showing how the residue value is calculated and carried forward.

In more general terms, referring to FIG. 4, the residue of the STS M bit Counter 40 at the time of a given accessing or servicing is stored in Residue Register 42 and the residue left at the time of next accessing of the STS M bit Counter 40 is added to the previous value stored in the Residue register 42 to provide a value for the first subrate. This process is repeated so as to determine the second, third, etc. subrate. A general virtual channel peak cell rate, VC_PCR, is calculated from the following:

$$VC\_PCR = (STS + \text{Residue }[N-1:0])/2^N \text{ for } N > 0$$

Thus, for

N=0, VC_PCR=STS

N=1, VC_PCR=(STS+Residue [0])/2

N=2, VC_PCR=(STS+Residue [1:0])/4

The variable bit rate scheduler supports only power of 2 subrates for the VC_PCR. This eliminates the need for a divider since divide by two can be accomplished simply by shifting logic.

Figure 5:
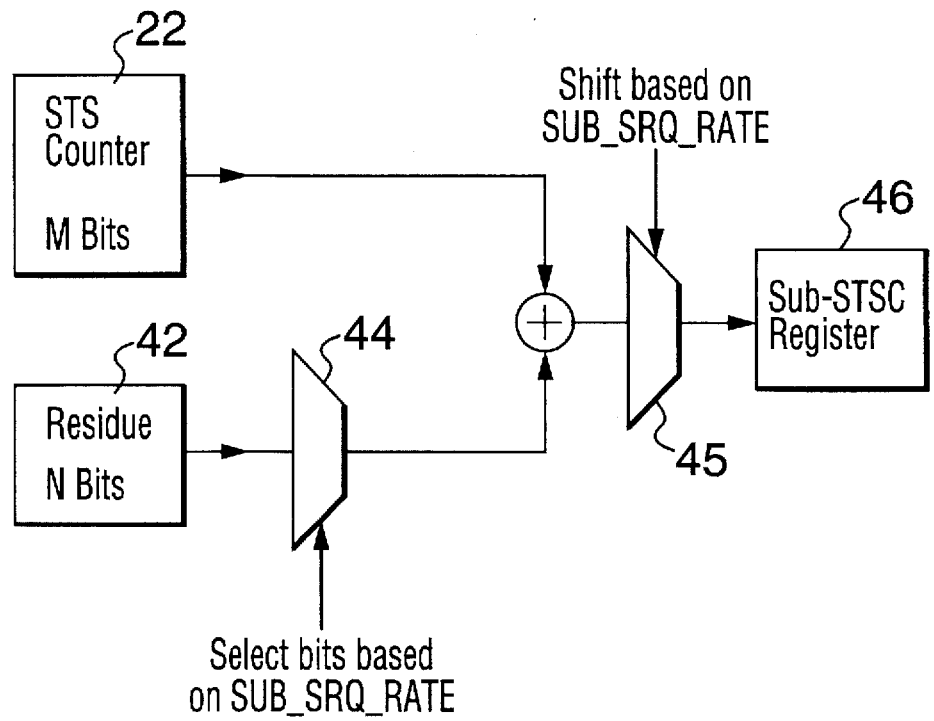
FIG. 5 is a schematic diagram showing how the virtual channel prescale counter values are determined from the saturating timestamp counter.

Referring to FIG. 5, there is shown the circuit for detecting a VC_PCR event for a given virtual channel. The value in the Residue Register 42 is passed through a selector circuit 44 which selects bits based on the SUB_SRQ_RATE. The value of selected bits is added to the value in the STS Counter 22 and is then sent to the input of a shift register 45 which shifts the value depending upon the SUB_SRQ_RATE. For example, if the latter rate is ¼ then there will be a two bit shift right so that, for example, the binary value xxxx becomes xx. The resulting shifted value is then stored in the sub-STSC Register 46. The latter value determines the VC_PCR cell rate. If this value is non-zero then a VC_PCR event has occurred and there is an opportunity to transmit a cell on that virtual channel. If there are enough tokens to satisfy the VC_SCR rate at which tokens are being added then a cell can be transmitted. Using this algorithm many VC_PCR's can be synthesized with a minimal amount of hardware.

To calculate the sustainable cell rate VC_SCR from the VC_PCR a concept of sub-tokens is used. Tokens define an opportunity to transmit data, and are added to the leaky bucket 10 at the VC_SCR rate and can be removed at the VC_PCR rate. The process of implementation of the leaky bucket algorithm can be considerably simplified by adding sub-tokens at the VC_PCR and removing them based on a Utilization parameter. If one defines a token as follows:

Token=UTILIZATION * sub-tokens

The following table details the relationship between Utilization, the number of sub-tokens required for transmission and the VC_SCR as a fraction of the VC_PCR.

| UTILIZATION | # of sub-tokens to remove = # of sub-tokens per token | VC_SCR |
|---|---|---|
| 1 | 1 | VC_PCR |
| 2 | 2 | VC_PCR/2 |
| 3 | 3 | VC_PCR/3 |
| 4 | 4 | VC_PCR/4 |
| N | N | VC_PCR/N |

With the above algorithm VC_SCR enforcement can be performed by using addition and subtraction instead of division to synthesize the VC_SCR from the VC_PCR. The following algorithm is used to perform the VC_SCR enforcement.

1. When the sub-STSC register is non-zero for a particular VC, add the value of the sub-STSC register to the bucket. The sub-STSC register value corresponds to sub-tokens.

2. When a cell is to be transmitted subtract the required number of sub-tokens based on the utilization field.

The bucket size can be set to any arbitrary value larger than the utilization field. Tokens will accumulate in the bucket 10 and the size of the bucket will determine the maximum burst size (MBS).

*MBS*=BUCKET/UTILIZATION

When the peak cell rate counter 20 rolls over the SRQ requires servicing. In the event the SRQ cannot be serviced (this can occur if there are many SRQs in the variable bit rate scheduler) the STS counter 22 contains the number of times the PCR counter 20 rolled over.

Figure 6:
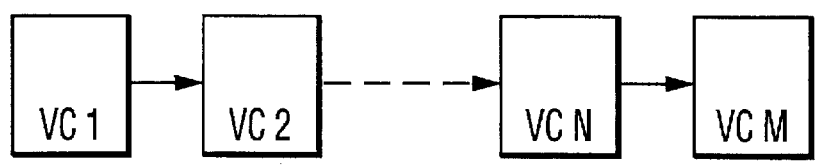
FIG. 6 is a schematic diagram showing the link list of virtual channels associated with each prescale select register.

Each SRQ has associated with it a link list of virtual channels supported as in FIG. 6. The VBR scheduler services each virtual channel in a SRQ to determine if a cell can be transmitted based on the VC_PCR and VC_SCR.

The SRQs can be prioritized such that some of the SRQs will always be serviced even if it means interrupting other SRQs. This way constant bit rate (CBR) virtual channels can be attached to the high priority SRQs and the jitter can be kept to a minimum.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A variable bit rate scheduler for ATM traffic shaping, comprising:
   (a) a service rate queue (SRQ) counter for generating a base traffic profile for the control of data transmission on a virtual channel;
   (b) a virtual channel peak cell rate determinator coupled to said SRQ counter and operative to determine a virtual channel peak cell sub-rate, VC_PCR;
   (c) a leaky bucket having an input for receiving sub-tokens and an output for discharging sub-tokens; and
   (d) means for adding sub-tokens at the virtual channel peak cell rate to the leaky bucket and, when a cell is to be transmitted, removing a number of sub-tokens from the bucket equal to the ratio of the virtual channel peak cell rate to a virtual channel sustainable cell rate.

2. A scheduler according to claim 1, wherein said SRQ counter includes
   (a) a prescale (PRS) counter which divides down a base clock for low rate traffic profiles by a prescale value set by a host in a SRQ prescale select register;
   (b) a peak cell rate (PCR) counter coupled to an output of said PRS counter having a peak cell rate rollover register which rolls over upon reaching a peak cell rate value set by an external host, resets the PCR counter and issues an output rollover count; and
   (c) a saturating timestamp (STS) counter coupled to an output of said PCR counter which accumulates rollover counts from said PCR counter.

3. A scheduler according to claim 2, including means for storing a parameter corresponding to a SUB_SRQ_RATE for each virtual channel (VC) in a service rate queue (SRQ) and equal to the integer value N where the SUB_SRQ_RATE is equal to the SRQ_RATE divided by $2^N$ and wherein the VC_PCR is equal to the SRQ_PCR divided by $2^N$.

4. A scheduler according to claim 3, including means for adding the least significant N bits in said STS counter to a residue value obtained from a residue register and storing the resultant new residue value in the residue register wherein the least significant N bits is determined at the time of servicing said STS counter.

5. A scheduler according to claim 4, including a residue register and a selector circuit coupled to an output of said residue register operative to store a register value from said residue register and to select bit "N" from the value so stored, an adder coupled to an output of each of said selector circuit and said STS Counter operative to add the N least significant bits from said STS Counter and the select bit from said bit selector, a shift register coupled to an output of said adder operative to store the bits from said adder and shifting the bits stored by the number of bits corresponding to the value of N for each SUB_SRQ_RATE.

6. A scheduler according to claim 3, wherein the bucket size is larger than the UTILIZATION parameter.

7. A scheduler according to claim 3, wherein sub-tokens are added to the bucket at the virtual channel peak cell rate and, when a cell is to be transmitted, a number of sub-tokens equal to the UTILIZATION are removed from the bucket.

8. A scheduler according to claim 3, wherein the maximum burst size is equal to the bucket size divided by the UTILIZATION.

9. A variable bit rate scheduler for ATM traffic shaping, comprising:
   (a) a plurality of service rate queue (SRQ) counters for generating a base traffic profiles for the control of data transmission on a plurality of virtual channels;
   (b) a plurality of virtual channel peak cell rate determinators coupled to respective ones of said SRQ counters and operative to determine virtual channel peak cell sub-rates, VC_PCR;
   (c) a plurality of leaky buckets having an input for receiving sub-tokens and an output for discharging sub-tokens; and
   (d) means for adding sub-tokens to each of said leaky buckets at a corresponding virtual channel peak cell rate and, when a cell is to be transmitted, removing a number of sub-tokens from an associated one of said buckets equal to the ratio of the virtual channel peak cell rate to a virtual channel sustainable cell rate, wherein each virtual channel in each SRQ is serviced to determine if a cell can be transmitted based upon the VC_PCR and VC_SCR.

10. A scheduler according to claim 9, wherein selected SRQ's are serviced in priority to other SRQs.

11. A method of scheduling traffic in an ATM network, comprising:
   (a) generating a base traffic profile for the control of data transmission on a service rate queue (SRQ);
   (b) generating a peak cell rate PCR for the SRQ;
   (c) establishing SUB-SRQ-RATEs for each virtual channel associated with the SRQ which are a fraction of or equal to the SRQ;
   (d) generating a VC_PCR for each virtual channel which is the same fraction of the SRQ_PCR as is the SUB_SRQ_RATE to the SRQ;
   (e) establishing each virtual channel sustainable cell rate, VC_SCR, as equal to VC_PCR divided by a UTILIZATION parameter value which is an integer greater than or equal to unity;
   (f) adding sub-tokens at the VC_PCR to a leaky bucket and, when a cell is to be transmitted, removing a number of sub-tokens from the bucket equal to the UTILIZATION parameter, the removal of the UTILIZATION number of sub-tokens corresponding to an opportunity to transmit a cell.

12. A method according to claim 11, wherein the step of generating a base traffic profile includes dividing down a base clock by a divider set in a SRQ Prescale Select register by an external host, and the step of generating a peak cell rate includes rolling over a counter which counts the divided down base clock once the counts equal a rollover value stored in a PCR rollover register by the external host and counting the number of rollovers in an STS Counter.

13. A method according to claim 12, wherein the step of generating a VC_PCR includes, in response to servicing the STS Counter, establishing a residue value in a residue register by adding the N least significant bits from the STS Counter to the bits in a residue register corresponding to a previous residue value to establish a new residue value in the residue register, transmitting the new residue value to a selector circuit and selecting bits based on the SUB_SRQ_RATE, adding in an adder circuit the bits selected in the selector circuit to the N least significant bits from the STS Counter, shifting the bits from the adder circuit in a shift register a number of bits equal to the exponent N of a divider $2^N$ by which the SRQ_PCR is divided to obtain the VC_PCR.

* * * * *